Figure 1:
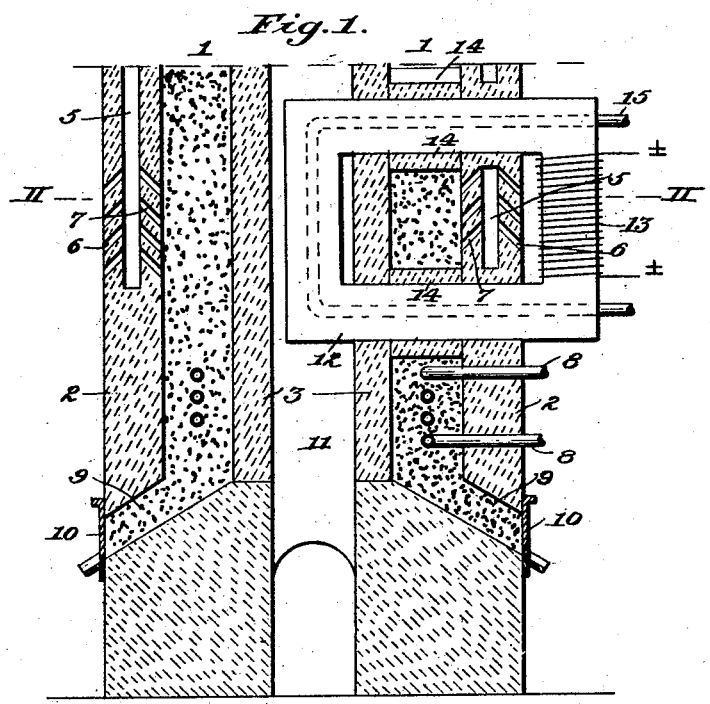

W. A. SMITH.
METHOD OF TREATING CARBON AND APPARATUS THEREFOR.
APPLICATION FILED MAY 23, 1912.

1,068,707.

Patented July 29, 1913.

Witnesses:
Robert J. Hulsizer.
N. P. Leonard.

Inventor:
William Acheson Smith,
by Byrnes, Townsend & Breckenstein,
Attys.

UNITED STATES PATENT OFFICE.

WILLIAM ACHESON SMITH, OF NIAGARA FALLS, NEW YORK, ASSIGNOR TO INTERNATIONAL ACHESON GRAPHITE COMPANY, OF NIAGARA FALLS, NEW YORK, A CORPORATION OF NEW JERSEY.

METHOD OF TREATING CARBON AND APPARATUS THEREFOR.

1,068,707.  Specification of Letters Patent.  Patented July 29, 1913.

Application filed May 23, 1912. Serial No. 699,313.

*To all whom it may concern:*

Be it known that I, WILLIAM ACHESON SMITH, a citizen of the United States, residing at Niagara Falls, in the county of Niagara and State of New York, have invented certain new and useful Improvements in Methods of Treating Carbon and Apparatus Therefor, of which the following is a specification.

This invention relates to methods of treating carbon or carbonaceous material for the purpose of converting it in a progressive or substantially continuous manner into a homogeneous, uniform, commercial product; and to electric furnaces suitable for use in carrying out such methods.

As is well known, such commercial forms of carbon as petroleum coke, gas coke, anthracite coal and the like undergo when heated a series of successive modifications, dependent not only upon the temperature to which they are heated but upon the duration of the heat treatment, without however undergoing any marked change of bulk such as is characteristic of most metallurgical or reducing operations. For example, moderate heating, or heating for a brief period to a high temperature, results in the expulsion of the volatile hydrocarbons; by longer heating at sufficient temperatures the less volatile impurities are driven off, and the carbon undergoes a progressive increase in density and electrical conductivity and becomes polymerized, and may under proper conditions be converted ultimately into graphite.

As between the several forms of carbon which may result from the application of heat to commercial carbonaceous materials, no mechanical separation is practicable, and it is essential in order that a given raw material may be converted throughout its mass into a commercial product of the desired character that the conditions as regards time and temperature of heating should be susceptible of accurate control and close adjustment, and that the heat should be so applied as to result in a practically uniform treatment of all particles traversing the furnace.

According to the present invention the body of carbon or carbonaceous material to be treated is moved progressively through a heating zone established by causing induced currents of electricity of suitable amperage to traverse the body of the carbonaceous charge, or an appropriate resister in contact with the charge, preferably but not necessarily in a direction substantially transverse to the direction of movement of the charge. By proceeding in this manner it is possible to secure a practically uniform heating of the entire cross-section of the charge. One or more heating zones may be provided according to the results desired.

For a full understanding of the invention, reference is made to the accompanying drawings illustrating a novel and preferred form of furnace which may be used for carrying the invention into effect, it being understood however that the method may be practised with the aid of furnaces of other form than that herein shown.

Figure 2:
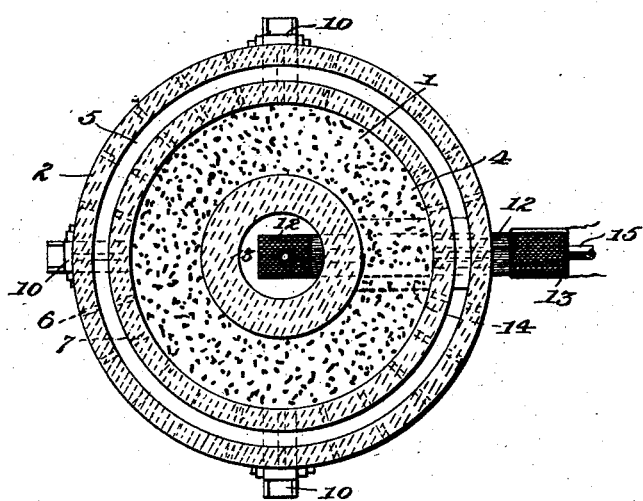

In said drawings Figure 1 is a central vertical section of the lower portion of the shaft furnace illustrating my invention; and Fig. 2 is a transverse section thereof on line II—II of Fig. 1.

In said drawings, 1 represents an annular furnace chamber inclosed by highly refractory walls 2, 3, and containing the carbonaceous charge 4, as for example petroleum coke. As illustrated, the outer wall 2 is provided with an annular combustion space 5, communicating by inclined ducts 6, 7 with the surrounding air and with the heating chamber 1, respectively, the construction being such that the gaseous or volatile products liberated within the furnace chamber may be burned in this combustion chamber for the purpose of preheating the charge and maintaining a proper temperature thereof. A coil 8 for water or other cooling medium is located in the lower portion of the heating chamber, below the heating zone, and serves to cool the charge below its temperature of combustion in air before the same is delivered to the discharge passages 9. These passages are controlled by gates 10, or any suitable mechanism is provided whereby the downward movement of the charge, either continuous or intermittent, may be properly controlled. The annular form of the heating chamber provides a central shaft 11.

13 represents the primary winding of the electric circuit, and 12 the core, which may consist of a heavy laminated ring. This core extends radially through the heating chamber 1, and is protected therein by refractory brick or other casings 14, constructed to afford as little obstruction to the downward movement of the charge as may be practicable. The core is preferably water-cooled by a coil 15, and is further cooled by the upwardly-moving current of air in the central shaft 11, into which the core extends.

The secondary or heating circuit is, in the particular construction illustrated, the conductive charge itself, the principal heat-development occurring in the zone which is looped by the core. The gas ducts 7 are shown as arranged adjacent this zone, although it is to be understood that they may be extended upwardly therefrom as far as may be desired, or even to the top of the shaft.

It will be understood that the primary winding, and also the core, may be arranged in any manner to secure the effect desired, that is to say the substantially even heating of the charge throughout its entire section by means of induced currents of electricity. It is also to be understood that a permanent secondary circuit may be provided if desired; thus for example, a carbon or graphite ring or band constituting the secondary circuit may be disposed either in or adjacent the walls of the heating chamber, or within the body of the charge. Thus the furnace may be adapted to the treatment of charges varying widely in their electrical conductivity.

I claim:

1. The method of treating carbon to prepare therefrom a commercially uniform product, which consists in subjecting the same to heat developed by induced electric currents.

2. The method of treating carbon to prepare therefrom a commercially uniform product, which consists in passing an induced electric current through a body of carbonaceous material.

3. The method of treating carbon to prepare therefrom a commercially uniform product, which consists in passing an induced electric current through a body of carbonaceous material, and advancing said body in a direction substantially transverse to the lines of current flow.

4. An electric shaft furnace having an annular heating chamber and a bottom discharge, and means located in the path of the advancing charge for subjecting the same to heat developed by induced electric currents.

5. An electric shaft furnace having an annular heating chamber and a bottom discharge, and means located in the path of the advancing charge for causing induced electric currents to traverse the body of said charge.

6. An electric shaft furnace having means for advancing a charge therethrough, and means for subjecting said advancing charge to heat developed by induced electric currents.

In testimony whereof I affix my signature in presence of two witnesses.

WM. ACHESON SMITH.

Witnesses:
  Frank N. Coe,
  Albert S. Knight.